(No Model.)
H. T. OWENS.
WHEEL FOR PLOWS.
No. 363,963. Patented May 31, 1887.
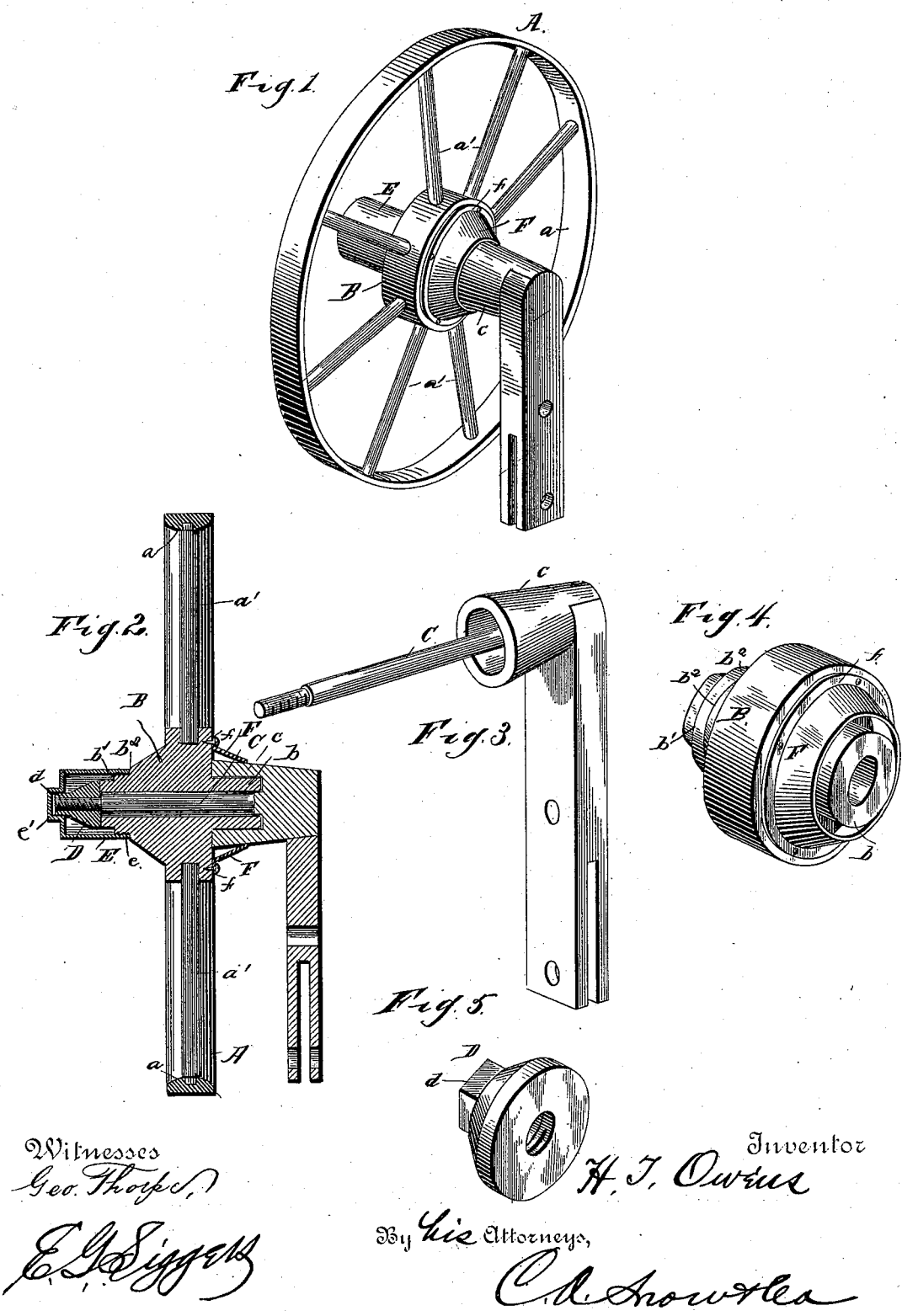
Witnesses
Geo. Thorpe
E. G. Siggers
Inventor
H. T. Owens
By his Attorneys,
C. A. Snow & Co.

UNITED STATES PATENT OFFICE.

HENRY TANDY OWENS, OF GRAFTON, CALIFORNIA.

WHEEL FOR PLOWS.

SPECIFICATION forming part of Letters Patent No. 363,963, dated May 31, 1887.

Application filed March 17, 1887. Serial No. 231,298. (No model.)

*To all whom it may concern:*

Be it known that I, HENRY TANDY OWENS, a citizen of the United States, residing at Grafton, in the county of Yolo and State of California, have invented a new and useful Improvement in Wheels for Plows, Cultivators, &c., of which the following is a specification.

The invention relates to improvements in wheels, particularly such as are used on plows, cultivators, and similar machines; and its object is to prevent sand, dust, and dirt from entering the hub, thereby rendering frequent repairs necessary and requiring frequent cleaning and greasing to prevent the journal and hub from cutting.

The invention consists, mainly, in inclosing the hub in casings, the construction and arrangement of which are hereinafter described, illustrated in the drawings, and embraced in the appended claim.

The invention consists, further, in certain hereinafter-described details of construction and arrangement, as shown in the drawings, and pointed out in the claim.

In the accompanying drawings, Figure 1 represents a perspective view of a wheel embodying the invention. Fig. 2 is a central transverse section of the wheel-hub and casings. Fig. 3 is a perspective view of the journal and axle and attached cap or casing detached from the wheel. Fig. 4 is a perspective view of the inner end of the hub. Fig. 5 is a perspective view of the journal-nut detached.

Referring to the drawings, A designates the rim of the wheel, convex in transverse section on its inner surface, $a$, for the purpose of not holding dirt and allowing it to drop upon the hub, and $a'$ $a'$ are the spokes connecting the rim and the hub B. The hub is bored centrally in the usual manner, and has on its inner face, surrounding the bore, the cylindrical boss $b$, the surface of the hub being flat around said boss. The outer part of the hub is tapered or conical, and is provided near its end with the two circumferential shoulders $b'$ $b^2$, respectively.

C is the journal, which may form part of a straight axis running from side to side of the machine, or may be the outer part of a short crank-axle, as shown in the drawings, and $c$ is a cap or casing, preferably cast upon it at a suitable point. The said cap has a cylindrical bore, to fit accurately upon the boss $b$ when the journal is passed through the bore of the hub, and a conical exterior surface converging in the direction from the wheel.

D is a nut that engages the threaded end of the journal C on the outside of the hub, and $d$ is the squared outer portion of the same.

E is a cylindrical casing threaded interiorly at its open end to engage the threaded portion $e$ of the hub between the shoulders $b'$ $b^2$, and having a rectangular cap, $e'$, made upon its closed outer end, which cap fits over and clasps the squared end of the nut D. The nut being thus held in the casing both nut and casing are screwed in place at the same time, the space between the shoulder $b'$ and the end of the casing forming an oil-chamber from which the oil cannot easily evaporate.

F is a conical casing having a flange, $f$, around its outer edge, through which it is bolted to the inner end of the hub, and with the cap or casing $c$ passing into its central circular opening.

It is evident that the outer end of the hub is entirely closed against the entrance of dirt, dust, or sand by the cylinder-casing E, and that should any of the said material fall upon the inner part of the hub they would be thrown off the same by the inclined surfaces of the casing F and the cap $c$, so that the hub is well protected and will not need frequent cleaning, greasing, or repair.

Having thus described my invention, I claim—

The combination of the axle or standard having the conical cap $c$ and the spindle C projecting therefrom, the said cap having an annular recess on its outer side around the base of the spindle, the wheel journaled on the spindle and having the hub provided on its rear side with the annular projecting bars $b$, fitting in the recess in the cap, and the conical casing on band F, secured to the inner side of the hub and surrounding the outer end of the cap $c$, substantially as described.

In testimony that I claim the foregoing as my own I have hereto affixed my signature in presence of two witnesses.

HENRY TANDY OWENS.

Witnesses:
H. E. HARRISON,
H. WICKWISE.